United States Patent Office 3,274,102
Patented Sept. 20, 1966

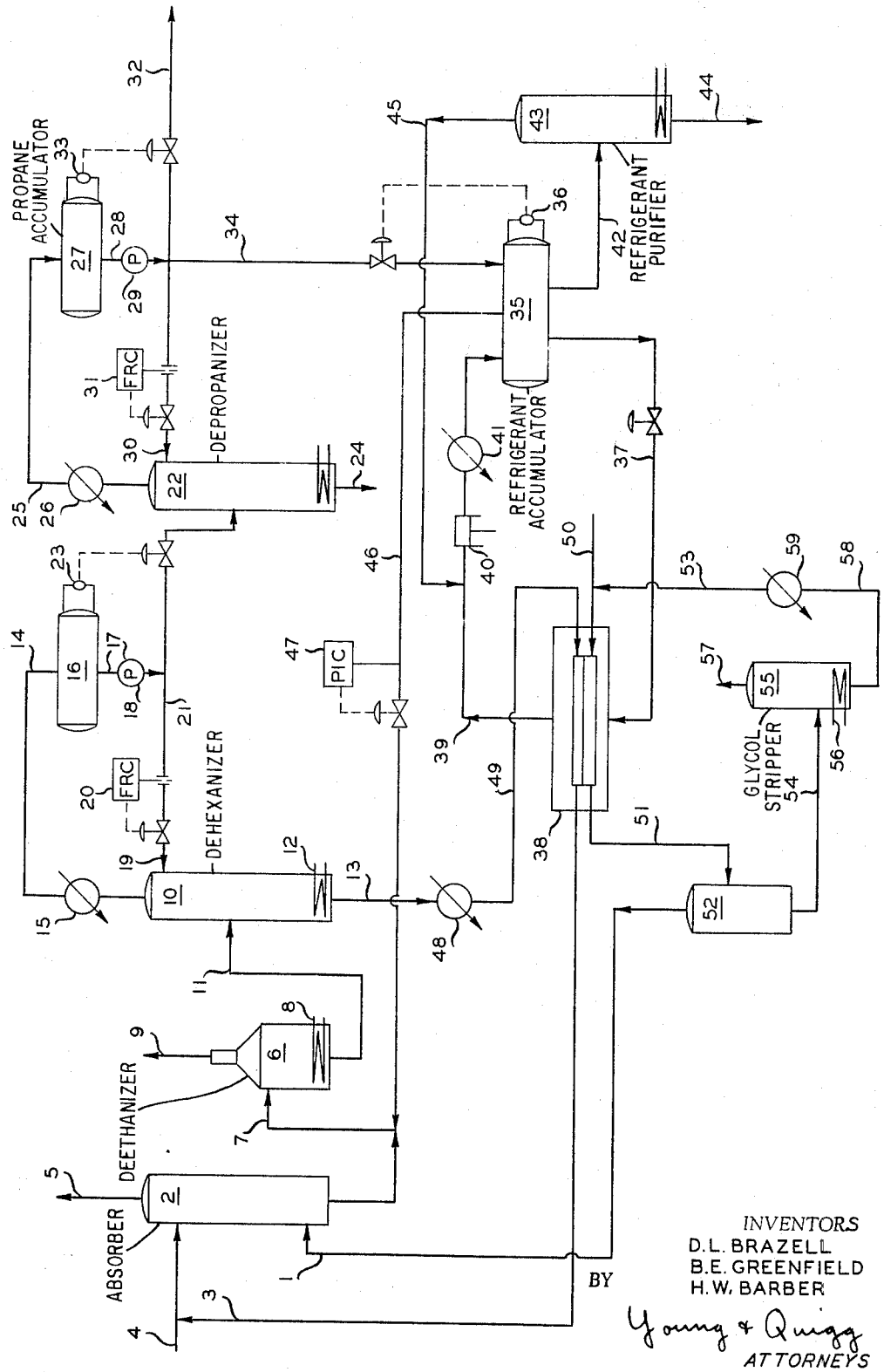

3,274,102
NATURAL GAS SEPARATION WITH REFRIGERANT PURIFICATION
Douglass L. Brazell, Bill E. Greenfield, and Harold W. Barber, Bartlesville, Okla., assignors to Phillips Petroleum Company, a corporation of Delaware
Filed Aug. 16, 1963, Ser. No. 302,556
5 Claims. (Cl. 208—341)

This invention relates to the separation of hydrocarbons. In one aspect this invention relates to a refrigeration process using an impure refrigerant.

It is common practice to use propane as the refrigerant in refrigeration systems for industrial plants. Substantially pure propane is generally employed for such use because of the adverse effects of contaminants on the efficiency of the refrigeration system. A portion of the liquid propane is withdrawn from the accumulator in the system to remove contaminants, such as oils from the compressor and heavier hydrocarbons. When lighter gases are present in the system, a concentration of non-condensed vapors build up in the accumulator causing a high pressure therein which reduces the efficiency of the compressor by requiring it to discharge against such pressure. The removal of oils from the system enhances the concentration of noncondensed gases in the accumulator because liquid propane is removed with the oils and discarded. A concentration of noncondensed gases in the accumulator is generally removed by venting them to a flare with the resultant loss of propane.

The use of substantially pure propane as a refrigerant makes the refrigeration costs for many plants very high due to the expense of purification and transporting propane to the plant location as most plants do not have the facilities to purify propane.

In the operation of a natural gas processing plant for the extraction of natural gasoline and liquefiable petroleum gas fractions, a propane product is produced. It would be very economical for plant operations to use this product as a refrigerant in the plant, however, such propane contains impurities and its use would encompass the above noted disadvantages. The venting of the non-condensed gases to a flare would make its use uneconomical because of the loss of valuable constituents therein.

We have now invented an economical method for utilizing an impure hydrocarbon product from a gasoline absorption process as a refrigerant for said process and recovery of valuable constituents contained in said refrigerant.

Accordingly, it is an object of this invention to provide an improved process for the separation of hydrocarbons. Another object of this invention is to provide a process for the separation of hydrocarbons wherein a product stream of the separation process is used as a refrigerant for the process. Another object of this invention is to provide an efficient refrigeration process employing an impure refrigerant. Another object of this invention is to provide a method and apparatus for the recovery of valuable constituents present in a refrigerant which is impure.

Other objects and advantages of our invention will be apparent from this disclosure, the drawings, and appended claims.

In accordance with this invention, an impure propane product is produced in a gasoline absorption process, a portion of said product is used as a refrigerant, and the noncondensed vapors in the refrigeration system are removed and recycled to the stripper in the said process. Propane removed from the system with the oil contaminants is recovered and recycled to the refrigeration system.

In low temperature gasoline absorption processes, a stream of natural gas comprising $C_1$ to $C_5$+hydrocarbons is contacted countercurrently with a stream of lean oil, such as mineral oil, in an absorber. Residual gas is removed from the absorber and the oil containing valuable gasoline constituents of the feed is introduced into a rich oil flash tank for removal of ethane and lighter gases. The deethanized rich oil is then distilled to remove the absorbed hydrocarbons from the absorption medium, and the absorption medium is recovered and recycled to the absorption step. The hydrocarbons are then stabilized wherein $C_3$ and lighter hydrocarbons are removed as vapors, condensed, and recovered as a product; and the remaining hydrocarbons are withdrawn as stabilized gasoline product. We utilize this impure propane product in a refrigeration system in indirect heat exchange with a lean oil stream and the gas feed stream to the absorber in the gas processing plant.

This invention will now be described more fully with reference to the accompanying drawing which shows a schematic flow scheme of a gasoline absorption process and a refrigeration system for use with said process.

Referring to the drawing, a raw natural gas feed is passed through conduit 1 to absorber 2. Lean absorption oil is passed through conduit 3 into absorber 2. Additional lean oil may be added through conduit 4. Within absorber 2 the raw gas feed is countercurrently contacted by the lean absorption oil. An overhead vapor stream is withdrawn from absorber 2 through conduit 5. Rich absorption oil is withdrawn from absorber 2 and introduced into rich oil deethanizer 6 through conduit 7. Heat is added to deethanizer 6 by means 8. Ethane and lighter materials are withdrawn as vapors from deethanizer 6 through conduit 9. Liquid is withdrawn from deethanizer 6 and introduced into dehexanizer 10 through conduit 11. Heat is added to dehexanizer 10 by means 12 to effect separation of hexane and lighter materials from the oil. Lean oil is withdrawn from dehexanizer 10 through conduit 13. Hexane and lighter materials are withdrawn from dehexanizer 10 as vapors through line 14. Said vapors pass through condenser 15 and are introduced into accumulator 16. Liquid is withdrawn from accumulator 16 through conduit 17. A portion of said liquid is introduced as reflux to dehexanizer 10 through pump 18 and conduit 19. The rate of flow of liquid flowing through conduit 19 is controlled in response to flow recorder controller 20. Another portion of liquid from accumulator 16 is passed through pump 18, conduit 21, and into depropanizer 22. The flow of liquid through conduit 21 is regulated in response to liquid level controller 23, associated with accumulator 16. Stabilized gasoline is withdrawn from depropanizer 22 through conduit 24. Propane and lighter materials are removed as vapors from depropanizer 22 through conduit 25, passed through condenser 26 into accumulator 27. Liquid is withdrawn from accumulator 27 through conduit 28, a portion of said liquid is returned through pump 29 and conduit 30 to depropanizer 22 as reflux. The flow of liquid through conduit 30 is controlled in response to flow recorder-controller 31. The remaining liquid is withdrawn as product through pump 29 and conduit 32. The flow of liquid through conduit 32 is regulated in response to liquid level controller 33 associated with accumulator 27. A portion of the liquid in conduit 32 is removed through conduit 34 and introduced into a refrigeration accumulator 35.

The flow of liquid through conduit 34 is regulated in response to liquid level controller 36, associated with accumulator 35. Liquid is withdrawn from accumulator 35 through conduit 37 and introduced into evaporator 38, wherein it is vaporized due to indirect heat exchange with lean oil and a gas stream. Vaporized refrigerant is withdrawn from evaporator 38 through conduit 39, passed through compressor 40, condenser 41 and returned to accumulator 35. Heavy materials, such as oils from the compressor, are removed from accumulator 35 through conduit 42 and introduced into separation tower 43. The heavy liquid contacts packing in column 43 to effect separation of the heavies from the propane. The heavies are withdrawn through conduit 44 and discarded. The propane is withdrawn as a vapor through conduit 45 and introduced into conduit 39 ahead of compressor 40. Noncondensed vapor in accumulator 35 are withdrawn through conduit 46 and introduced into conduit 7 for introduction into rich oil deethanizer 6 wherein propane is recovered and ethane and lighter gases are removed. The flow through conduit 46 is regulated in response to pressure indicator-controller 47. The lean oil withdrawn from the dehexanizer 10 through conduit 13 is passed through cooler 48 and introduced to evaporator 38 through conduit 49 to be refrigerated, and is withdrawn therefrom through conduit 3 for introduction to absorber 2. Raw gas containing ethylene glycol is introduced to evaporator 38 through conduit 50 to be refrigerated, and is withdrawn therefrom through conduit 51 and introduced to separator 52. Cold raw gas is withdrawn from separator 52 through conduit 1 for introduction into absorber 2. Ethylene glycol is removed from separator 52 through conduit 54 and introduced into stripper 5. Heat is added to stripper 55 by means 56 for separating water from the ethylene glycol. Water vapor is withdrawn from stripper 55 through conduit 57. Ethylene glycol is withdrawn from stripper 55 through conduit 58, passed through cooler 59 and introduced to the raw gas through conduit 53.

The following example of a material balance around the refrigeration system further illustrates the invention but is not intended in any manner to limit the invention.

*Example*

Approximately 700 gallons per day of propane product from a gasoline absorption process comprising approximately approximately 96.0 percent $C_3$, 3.5 percent $C_2$ and 0.5 percent iso $C_4$'s and heavies is added to the refrigeration system accumulator through line 34. About 50 to 100 gallons per day of liquid comprising 70 to 90 percent oils and heavies is withdrawn from the accumulator and introduced into a separation tower 43. Approximately 8 to 15 gallons of oils are drained from said tower every 4 hours. From 200 to 300 gallons per day of vapors, measured as liquid, comprising 10 to 40 percent $C_2$ and lighter hydrocarbons are withdrawn from the refrigeration system accumulator and introduced back to the deethanizer in the absorption system. This refrigeration system cools approximately 700,000 gallons per day of lean oil, stream 49, from 35 to 40° F., to −10° F. It also cools approximately 140,000,000 cubic feet per day of feed gas from 90° F. to −10° F.

From the above material balance it is readily apparent that considerable economic savings are obtained by using the impure propane product stream from the absorption process as the refrigerant used in the refrigeration system required for the process. A considerable savings of propane and other valuable constituents is obtained by recycling the vapors from the refrigeration system accumulator back to the absorption process.

The venting of the vapors from the refrigeration system accumulator has the advantage of reducing the concentration of light gases in the refrigerant which reduce the efficiency of the refrigeration process and the introduction of said gases to the absorption process has the advantage of recovering valuable constituents therein.

Various modifications and ramifications of the invention will be apparent to one skilled in the art without departing from the spirit or scope of said disclosure and claims.

We claim:
1. A gasoline absorption process comprising:
introducing a natural gas stream to an absorption zone;
introducing lean oil to said absorption zone;
countercurrently contacting said stream with said oil in said absorption zone to effect absorption of the hydrocarbon components in said stream by said oil;
passing the resulting rich oil from said absorption zone to a deethanizing zone for removing ethane and lighter materials;
passing the deethanized rich oil to a stripping zone for removal of the absorbed hydrocarbons from the oil;
withdrawing the resulting lean oil from said stripping zone;
withdrawing the resulting vaporized hydrocarbons from said stripping zone and condensing same;
passing the condensed hydrocarbons to a depropanizing zone for removing propane and lighter materials;
withdrawing the resulting depropanized hydrocarbons from said depropanizing zone as the gasoline fraction product;
withdrawing the resulting vaporized hydrocarbons from said depropanizing zone and condensing same as an impure propane product;
passing a portion of said condensed impure propane product to a refrigeration system;
passing said natural gas stream and said lean oil prior to said introducing steps in indirect heat exchange relationship with said impure propane to cool said stream and lean oil and to vaporize said impure propane;
compressing the thus vaporized said impure propane;
condensing the thus compressed impure propane and recycling same to said heat exchange relationship; and
withdrawing and passing noncondensible material from said condensed impure propane to said deethanizing zone for removal of the noncondensibles and recovery of propane.
2. The method of claim 1 further comprising:
passing a portion of the condensed impure propane from the refrigeration cycle to a purification zone for removal of heavy materials; and
passing the resulting vaporized propane from said purification zone to said compressing step.
3. The method of claim 8 wherein said lean oil withdrawn from said stripping zone is the lean oil passed in said heat exchange relationship.
4. Gasoline absorption apparatus comprising, in combination:
an absorber having inlet conduits for natural gas and lean oil;
a deethanizer communicating with said absorber;
a stripper communicating with said deethanizer and having an outlet communicating with said absorber inlet for lean oil;
a depropanizer communicating with said stripper and having product outlets for impure propane and gasoline; and
a refrigeration system having an accumulator communicating with said depropanizer outlet for impure propane and said deethanizer, a heat exchanger communicating with said accumulator and said absorber inlets, a compressor communicating with said heat exchanger, and a condenser communicating with said compressor and said accumulator.
5. The apparatus of claim 4 further comprising a stripper communicating with said accumulator and said compressor.

References Cited by the Examiner

UNITED STATES PATENTS

| | | | |
|---|---|---|---|
| 1,456,953 | 5/1923 | Van Groeling | 62—17 |
| 1,884,312 | 10/1932 | Sloan | 62—475 |

(References on following page)

UNITED STATES PATENTS

| | | | |
|---|---|---|---|
| 1,937,871 | 12/1933 | Cox | 208—341 |
| 1,972,060 | 8/1934 | Cole | 208—351 X |
| 2,028,432 | 1/1936 | Barton | 62—17 X |
| 2,181,633 | 11/1939 | Hutchinson | 208—351 X |
| 2,236,965 | 4/1941 | Babcock | 62—40 X |
| 2,364,660 | 12/1944 | Reid | 62—17 X |
| 2,497,421 | 2/1950 | Shiras | 62—40 X |
| 2,619,814 | 12/1952 | Kniel | 62—40 X |
| 2,627,318 | 2/1953 | Swerdloff | 62—23 X |
| 2,765,635 | 10/1956 | Redray | 62—17 |
| 2,780,580 | 2/1957 | Kniel | 62—40 X |
| 2,794,334 | 6/1957 | Peaslee | 62—40 X |
| 2,959,022 | 11/1960 | Twomey | 62—40 X |
| 2,960,837 | 11/1960 | Swenson | 62—40 X |
| 2,971,352 | 2/1961 | Parker | 62—475 |
| 3,020,723 | 2/1962 | De Lury | 62—40 X |

OTHER REFERENCES

"Light Hydrocarbon Recovery and Separation Process," Petroleum Refiner, vol. 28, No. 9, September 1949, pp. 213–240.

NORMAN YUDKOFF, *Primary Examiner.*

V. W. PRETKA, J. C. JOHNSON, *Assistant Examiners.*